No. 728,394. PATENTED MAY 19, 1903.
J. T. HOVIS.
VEHICLE BRAKE.
APPLICATION FILED JUNE 20, 1902.
NO MODEL.
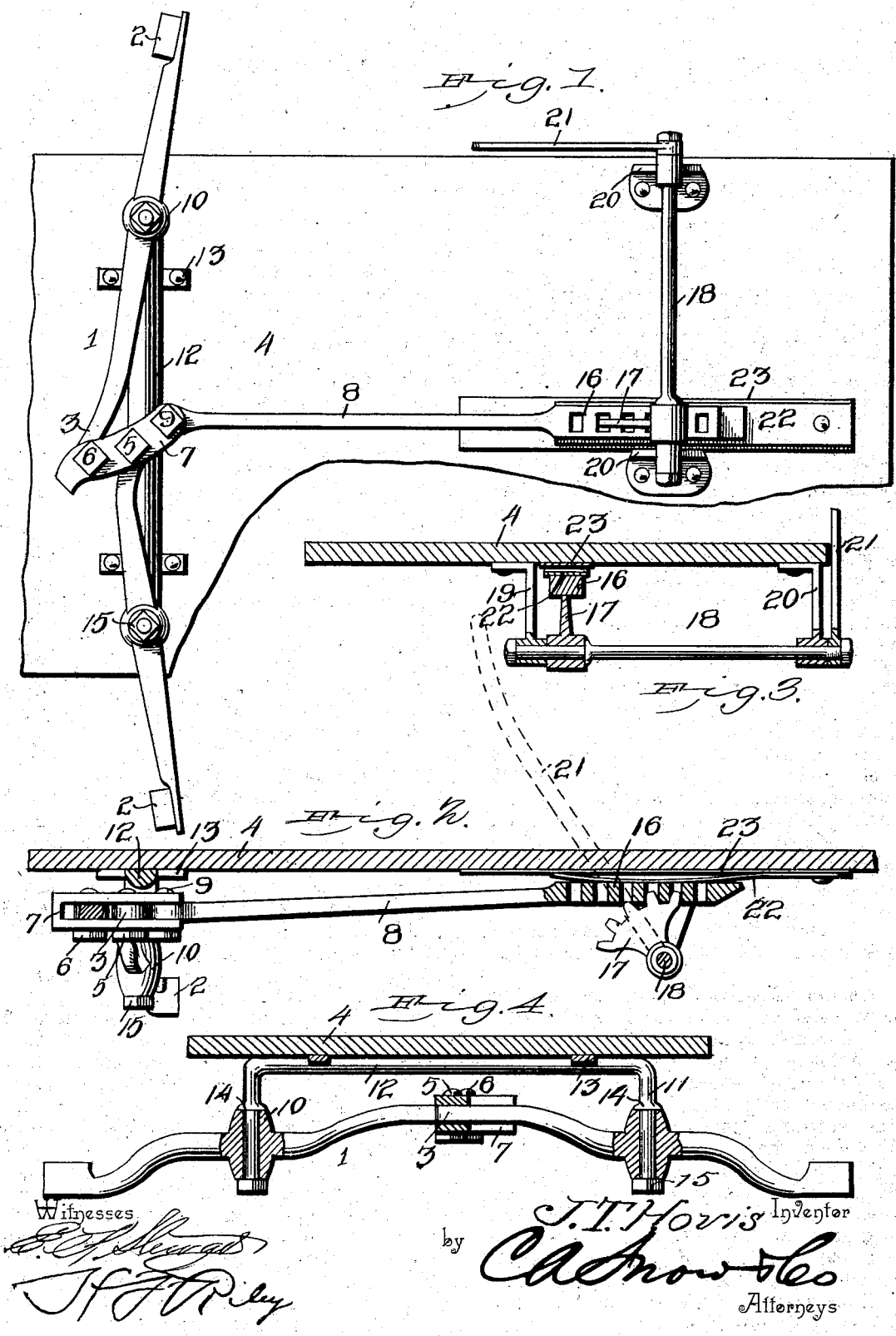

No. 728,394. Patented May 19, 1903.

UNITED STATES PATENT OFFICE.

JOHN THEODORE HOVIS, OF CLINTONVILLE, PENNSYLVANIA.

VEHICLE-BRAKE.

SPECIFICATION forming part of Letters Patent No. 728,394, dated May 19, 1903.

Application filed June 20, 1902. Serial No. 112,520. (No model.)

*To all whom it may concern:*

Be it known that I, JOHN THEODORE HOVIS, a citizen of the United States, residing at Clintonville, in the county of Venango and State of Pennsylvania, have invented a new and useful Vehicle-Brake, of which the following is a specification.

The invention relates to improvements in vehicle-brakes.

The object of the present invention is to improve the construction of vehicle-brakes and to provide an exceedingly simple and inexpensive one of great strength and durability, adapted to be readily applied to all kinds of vehicles, and capable of enabling great power to be readily applied for checking or stopping a vehicle.

The invention consists in the construction and novel combination and arrangement of parts hereinafter fully described, illustrated in the accompanying drawings, and pointed out in the claims hereto appended.

In the drawings, Figure 1 is a reverse plan view of a portion of a vehicle provided with a brake constructed in accordance with this invention. Fig. 2 is a longitudinal sectional view of the same. Fig. 3 is a transverse sectional view of the front portion of the vehicle-brake. Fig. 4 is a similar view of the rear portion of the same.

Like numerals of reference designate corresponding parts in all the figures of the drawings.

1 1 designate a pair of brake-levers designed to be provided at their outer ends with suitable brake-shoes 2, and having their inner ends 3 extended beyond the center and bent at a slight angle to arrange them diagonally of the body 4 and provided with perforations for the reception of bolts 5 and 6, which pivotally connect the inner ends of the brake-levers to a link 7. The link 7 is composed of upper and lower sides and a connecting rear portion, as clearly shown in Fig. 2, and the front end of the link, which is extended to form a lever, is open to receive a connecting-rod 8, which is pivoted to the link by a bolt 9 or other suitable fastening device. The brake-levers are provided between their ends with eyes 10, projecting above and below the brake-levers and receiving depending arms or portions 11 of a transverse supporting-bar 12, which is secured to the body of the vehicle. The supporting-bar 12 is provided between its ends with projecting ears 13, which are perforated for the reception of bolts or other suitable fastening devices for securing the bar to the bottom of the body or other support, and the ends of the supporting-bar are bent downward to form the arms or portions 11. The arms 11 are rounded and reduced to receive the eyes and to form shoulders 14 for engaging the upper ends of the same, and the lower ends of the arms 11 are threaded for the reception of nuts 15, which retain the brake-levers on the arms of the supporting-bar.

The connecting-bar is provided at its front portion with a rack 16, consisting of a flattened portion of the bar provided at regular intervals with openings and located above and meshing with a sector-gear 17. The sector or gear 17 is mounted on a transverse shaft 18, journaled in suitable bearings of brackets 19 and 20, and provided at its outer end with an arm or lever 21, located at one side of the body of the vehicle and arranged within easy reach of the occupants. The bearing-brackets, which are tapering, depend from the bottom of the body and are provided at their tops with perforated plates or flanges which are secured to the body.

The sector or gear 17 is disposed vertically and is spaced from the bottom of the body, and the rack is interposed between the sector and the bottom of the body and is held in mesh with the former by a bowed spring 22, extending longitudinally of the connecting-bar and secured at one end to the body and having its other end free, a wear-plate 23 being arranged to receive the spring to prevent the same from wearing the bottom of the body. The spring frictionally engages the rack and holds the parts against accidental movement and obviates the necessity of employing a ratchet for locking the brake-shoes off the wheels. The connecting-bar is disposed at an inclination, as clearly shown in Fig. 2, and its front end, which is in advance of the sector-gear, is adapted to suppress the spring farther when the connecting-bar is moved rearward to throw the brake-shoes off the wheels. When the connecting-bar is moved rearward to the limit of its movement, the inner ends of the brake-levers are carried rearward and outward and are brought in alinement with the center of the body, and the link is swung around to a position in alinement with the connecting-bar, which is held against movement by the spring, whereby the brake-shoes are securely held out of engagement with the wheels.

It will be seen that the brake is exceedingly simple and inexpensive in construction, that it is strong and durable and adapted to be readily applied to a vehicle, and that it is adapted to dispense with the segmental rack or ratchet or similar device for holding the brake-shoes off the wheels.

What I claim is—

1. A brake comprising a pair of transverse levers provided at their outer ends with brake-shoes, a longitudinal rod connected with the inner arms of the brake-levers and arranged at an inclination and provided with a rack, a gear located beneath and meshing with the rack and supporting the same, a spring located above and engaging the rack and arranged to be compressed by the longitudinal movement of the same, whereby the brake-shoes will be held in engagement with the wheels, and means for operating the gear, substantially as described.

2. A brake comprising a pair of transverse levers provided at their outer ends with brake-shoes and having their inner ends overlapped and angularly bent in opposite directions, a short link pivoted to the inner ends of the levers and arranged diagonally of the vehicle when the brake is applied and adapted to be swung around to a longitudinal position, to form a lock for holding the brake-shoes off the wheels, a connecting-rod extending forward from the link at an inclination and provided with a rack, a gear located beneath and meshing with the rack and supporting the same, and a bowed spring located above and engaging the connecting-rod and arranged to be compressed when the same is moved forward, whereby the brake-shoes will be locked in engagement with the wheels, substantially as described.

In testimony that I claim the foregoing as my own I have hereto affixed my signature in the presence of two witnesses.

JOHN THEODORE HOVIS.

Witnesses:
  C. W. DAVIS,
  GEO. A. RUMSEY.